United States Patent [19]

Oishi

[11] 4,341,365
[45] Jul. 27, 1982

[54] VIDEO TAPE CASSETTE

[75] Inventor: Kengo Oishi, Odawara, Japan

[73] Assignee: Fuji Photo Film Co., Ltd., Kanagawa, Japan

[21] Appl. No.: 187,674

[22] Filed: Sep. 16, 1980

[30] Foreign Application Priority Data

Sep. 17, 1979 [JP] Japan .......................... 54/128882[U]

[51] Int. Cl.$^3$ .......................... G03B 1/04; G11B 15/32
[52] U.S. Cl. ...................................... 242/199; 242/68; 242/194
[58] Field of Search ....................... 242/194, 197–200, 242/68, 68.3; 360/96, 132, 93

[56] References Cited

U.S. PATENT DOCUMENTS

| | | | |
|---|---|---|---|
| 3,756,521 | 9/1973 | Werner | 242/200 |
| 3,913,145 | 10/1975 | Wiig | 360/132 |
| 4,097,006 | 6/1978 | Saito | 242/199 |

Primary Examiner—Leonard D. Christian
Attorney, Agent, or Firm—Sughrue, Mion, Zinn, Macpeak & Seas

[57] ABSTRACT

A miniaturized video tape cassette having flangeless tape winding hubs. Each hub is composed of an inner drum loosely fitted within an outer drum with torque transmitted between the drums via arms extending from the inner drum and fitting into corresponding slots in the outer drum. A groove is formed between the inner and outer drums which is disposed around a cylindrical support extending from the lower cassette half. Teeth are provided in the hub and cassette which engage to hold the tape stationary when the cassette is not in use. A spring biases the hubs towards the engaged position except when the cassette is loaded with into a video tape machine in which case the hubs are lifted away from the teeth of the cassette.

6 Claims, 12 Drawing Figures

VIDEO TAPE CASSETTE

BACKGROUND OF THE INVENTION

The invention relates to video tape cassettes. More particularly, the invention relates to an improved video tape cassette having flangeless type tape winding cylindrical hubs.

Recently, there has been a tendency to miniaturize video tape systems while improvements in the performance of video tapes are concurrently desired. More specifically, recently the diameter of rotary drums for video tape devices have been reduced leading to a decrease in the size of the casings of video tape cassettes used with such systems. Miniaturization of the rotary drums and the cassette casings is essential for portable video systems.

In a conventional video tape cassette, the tape winding hubs are provided with flanges. The hubs are mounted at predetermined positions in the lower half of the cassette in advance during the assembly of the cassette. In order to prevent the removal of the hubs from the predetermined positions, ribs are provided on the inner surface of the lower cassette half at positions so as to surround the flanges of the hubs mounted at the predetermined positions.

Hubs with flange are disadvantageous in the following points. Since the flange must have a certain minimum thickness, the overall depth of the hub is relatively large. This is an obstacle to the miniaturization of the video tape cassette.

In order to realize a practical miniaturized video tape cassette, it has been proposed to use a flangeless cylindrical hub as the tape winding hub. A flangeless hub is thinner by as much as the thickness of the two flanges than the hub with flanges and, accordingly, the size of a video tape cassette with the flangeless hub can be made smaller.

However, the flangeless hub has certain disadvantages. In a conventional video tape cassette, in order to prevent rotation of the hubs, that is, in order to prevent slack in the tape when the cassette is not used, a tape slack preventing mechanism is provided which includes teeth formed on the periphery of the flange of the hub and a ratchet pawl pivotally mounted on the casing which can engage and disengage with the teeth. Since a flangeless hub has no flange, it is impossible to provide such a tape slack preventing mechanism as in a conventional cassette.

If the hub or reel is modified so that it has no flange as described above, then the space occupied by the reels can be reduced and accordingly the size of the cassette can be also reduced. However, another problem arises with such a modification relating to the absence of means for suitably controlling the magnetic tape wound on the reel. For instance, if the rotary shaft of the video is inclined, the magnetic tape while being run is shifted upwardly or downwardly with respect to the desired running direction as a result of which the tape is wound irregularly on the reel or hub. As a result, the end faces of the wound tape become parabolic or stepped and the magnetic tape is run unstably. This adversely affects the reproduced picture quality and lowers the overall reliability of the video system.

SUMMARY OF THE INVENTION

Accordingly, an object of the invention is to overcome the above-described difficulties accompanying a conventional video tape cassette. More specifically, an object of the invention is to provide a magnetic tape cassette in which the tape is stably run by employing a technique in which the above-described conventional reel or hub is modified to a hub which has no flange and which has a dual structure made up of a driving part, hereinafter referred to as "an inner drum", and a magnetic tape winding part, hereinafter referred to as "an outer drum". In the tape cassette of the invention, only the driving force of the inner drum is transmitted to the outer drum so that inclination of the inner drum does not affect the outer drum.

Another object of the invention is to provide a video tape cassette which is miniaturized by the use of the above-described relatively thin flangeless hubs as the tape winding hubs and in which the hubs are not readily displaced from predetermined positions.

A further object of the invention is to provide a miniature video tape cassette which has the above-described flangeless hubs yet has a tape slack preventing mechanism.

Provided in accordance with the invention is a video tape cassette constructed of a casing made up of an upper cassette half and a lower cassette half and a pair of magnetic tape feeding and take-up flangeless type cylindrical tape winding hubs incorporated in the case. According to the invention, each of the hubs has a dual structure including an inner drum adapted to engage the drive shaft of a video tape recorder device and an outer drum on which magnetic tape is wound. The inner drum has first engaging means for transmitting torque to the outer drum, the outer drum having second engaging means for receiving torque from the first engaging means, and the inner drum is loosely fitted into the outer drum in the axial direction of the drive shaft.

Furthermore, according to the invention, the lower cassette half is provided with a cylindrical support extending upwardly from the inner surface of the lower cassette half to rotatably support the dual-structure hub. The outer drum of the dual-structure hub has an outer circumferential wall and the inner drum has on the lower surface thereof an inner circumferential wall and a rotation contact surface which is in contact with the upper surface of the cylindrical support. The inner drum and the outer drum are assembled to form an engaging groove coaxially with the dual-structure hub which extends from the lower surface of the dual-structure hub substantially to half of the height of the outer circumferential wall. The cylindrical support and the dual-structure hub are rotatably supported.

In addition, according to the invention, the height of the cylindrical support is so selected that the bottom of the engaging groove formed by the inner drum and the outer drum of the dual-structure hub is brought into contact with the upper surface of the cylindrical support when the cassette is not in use. The two surfaces thus brought into contact with each other are provided with teeth which are engaged with each other to thereby prevent rotation of the dual-structure hub at least in the tape unwinding direction thereof. The casing has biasing means therein which is adapted to bias the dual-structure hub so that the two surfaces are brought into contact with each other in such a manner that, when the cassette is not in use, the two surfaces are held in contact with each other to prevent rotation of the dual-structure hub in the tape unwinding direction.

Moreover, according to the invention, the tape winding dual-structure hub is depressed upwardly against the force of the biasing means when the cassette is in use whereby the two surfaces are disengaged from each other to allow the dual-structure hub to freely rotate.

DESCRIPTION OF THE PREFERRED EMBODIMENTS

A video tape cassette according to a preferred embodiment of the invention will be described with reference to the accompanying drawings.

Figure 1:
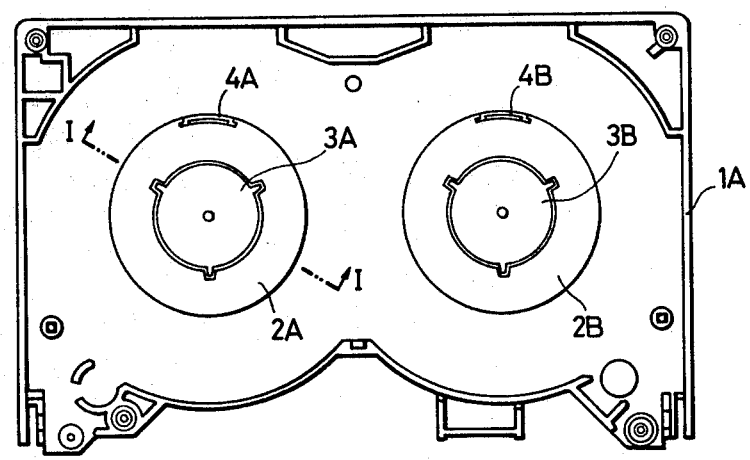
FIG. 1 is a plan view showing the lower cassette half of a video tape cassette and a pair of flangeless type dual-structure tape winding hubs provided on the lower cassette half according to the invention.

In the video tape cassette, two flangeless type tape winding hubs 2A, 3A and 4A; and 2B, 3B and 4B are provided in the lower cassette half 1 of a casing as shown in FIG. 1. Each hub is made up of an outer drum or a magnetic tape winding part 2A or 2B, an inner drum 3A or 3B, and a tape clamp 4A or 4B engaging the outer drum 3A or 3B. Since the two hubs have the same construction, only one tape winding hub (2A, 3A and 4A) will be described.

Figure 2:
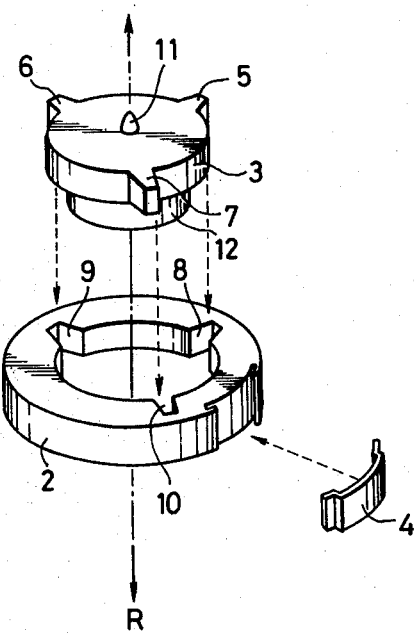
FIG. 2 is a perspective exploded view showing the dual-structure tape winding hub in FIG. 1 as viewed from above.

FIG. 2 is a perspective view of the tape winding hub 2A, 3A and 4A disassembled and viewed from above. The tape winding hub includes the outer drum 2, the inner drum 3 and the tape clamp 4. The outer drum 2 and the inner drum 3 can be disassembled by moving them apart in the direction of the rotational axis of the hub. As shown in FIG. 2, the inner drum 3 has first engaging means provided as arms 5, 6 and 7 for transferring the rotational energy of the inner drum to the outer drum while the outer drum 2 has second engaging means provided as corresponding slots 8, 9 and 10 in which are engaged the engaging arms so that the rotational energy of the inner drum is transferred to the outer drum. The inner drum 3 has a protrusion 11 at the center of the upper surface used to support the rotation of the dual structure hub and an annular wall 12 on the lower surface. Each of the engaging arms is in the form of a protrusion and each of the slots is in the form of a mating groove with the engaging arms 5, 6 and 7 loosely engaged in the slots 8, 9 and 10 in the direction of the axis of a drive shaft R. The hub may be modified, if desired, depending on operational requirements of the video device in which the cassette is loaded, so that the inner drum 3 and the outer drum 2 are free to move only in one direction along the drive shaft R. For instance, the inner drum may be made removable downwardly but not upwardly or vice versa. Furthermore, it is preferable in view of providing a loose fit and for ease of molding that, with respect to a plane dividing the outer drum 2 longitudinally, the upper and lower halves thereof are symmetrical.

In FIG. 2, three slots and arms are shown. However, a different number may be used although there should be at least two. Otherwise, a number of paired engaging arms and slots can be provided by dividing the circumference of the hub at equal intervals and providing preferably three to six pairs of engaging arms and slots. The use of only one pair of engaging arms and slots is not preferred because the torque in that case would not be sufficiently transferred. The provision of an overly large number of pairs of engaging arms and slots is also undesirable because the molding of the hub then becomes difficult.

In FIG. 2, the first engaging arms and corresponding slots are provided, respectively, on the inner and outer drums. However, the engaging arms may be provided on the outer drum and the slots provided on the inner drum if desired.

Figure 3:
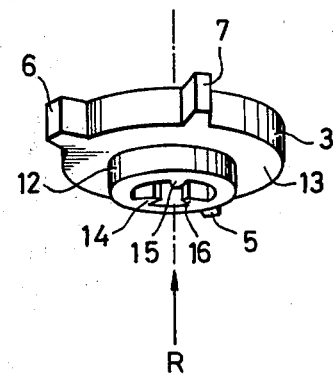
FIG. 3 is a perspective view showing only an inner drum as viewed from below which forms a part of the tape winding hub.

FIG. 3 is a perspective view of the inner drum 3 as viewed from below. The annular wall 12 on the lower surface of the inner drum 3 is engaged with a cylindrical engaging wall in the lower cassette half. A rotation contact surface 13 is brought into contact with the cylindrical engaging wall. Engaging protrusions 14, 15 and 16 are formed inside the annular wall 12 so as to be engaged with the drive shaft R (not shown) of the video device.

Figure 4A:
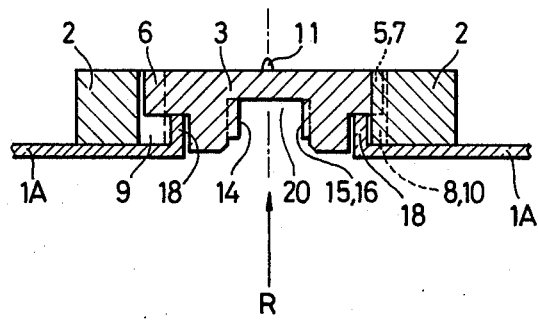
FIG. 4A is a sectional view taken along a line I—I in FIG. 1 showing the dual-structure hub supported by the lower cassette half in FIGS. 2 and 3.
Figure 4B:
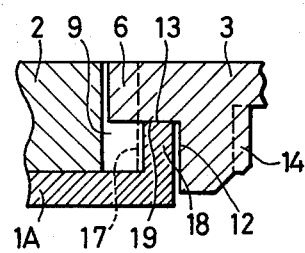
FIG. 4B is an enlarged view of a part of FIG. 4A.

FIG. 4A is a sectional view taken along line I—I in FIG. 1 showing the hub (FIGS. 2 and 3) supported by the lower cassette half. FIG. 4B is an enlarged view of the left half of the hub and the lower cassette half shown in FIG. 4A. In FIGS. 4A and 4B, reference numerals 1A, and 2 through 16 designate the same components designated by the same reference characters in FIGS. 1 through 3. Further, reference numeral 17 designates the outer circumferential wall of the outer drum 2. A cylindrical support 18 extends upwardly from the upper surface of the lower cassette half to rotatably support the hub having the described dual structure. Reference numeral 19 designates the rotation contact surface of the cylindrical support 18.

In this embodiment of a video tape cassette according to the invention, as shown in FIGS. 4A and 4B, a cylindrical engaging wall 18 is provided, the outer drum 2 of the dual-structure hub forms the outer circumferential wall 17, the inner drum 3 has an annular wall or inner circumferential wall 12 and the rotation contact surface in contact with the cylindrical engaging wall upper surface 19. When the outer drum 2 and the inner drum 3 are coupled to each other, an engaging groove is formed coaxially by the dual-structure hub extending substantially to half of the height of the outer circumferential wall 17 whereby the dual-structure hub is rotatably supported by the cylindrical support 18.

The lower cassette half 1A is provided with the cylindrical support 18 which extends upwardly from the upper surface of the lower cassette half as described above. The thickness of the cylindrical support 18 is less than the width of the engaging groove formed by the dual-structure hub so that the support 18 can be disposed in the engaging groove. It is desirable that the height of the support 18 be substantially equal to that of the engaging groove.

The engaging groove formed in the dual-structure hub can be engaged with the cylindrical support 18 of the lower cassette half 1A as shown in FIGS. 4A and 4B. Under this condition, the dual-structure hub is rotatably supported by the cylindrical support 18.

A shaft hole 20 adapted to be engaged with the drive shaft R and defined by the protrusions 14, 15 and 16 provided inside the inner circumferential wall 12 preferably extends nearly to the upper surface of the inner drum 3 so as to insure satisfactory support of the hub.

A leaf spring or a friction sheet (not shown) is provided in the video tape cassette to bias the hub in the axial direction. In order for the central portion of the upper surface of the hub to be depressed by these components, it is preferably that the shaft hole 20 extend to the vicinity of the upper surface of the hub but not to the upper surface, that is, it is not a through-hole. Thus, because of the provision of the shaft hole 20, the dual-structure hub is substantially cylindrical.

Figure 5A:
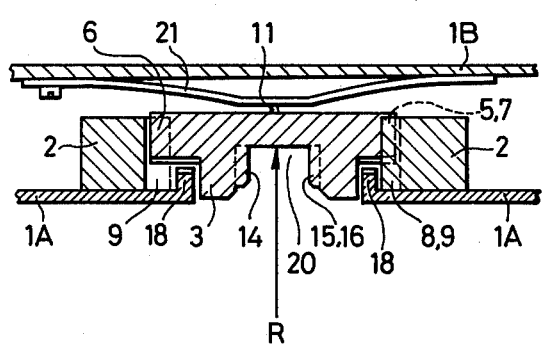
FIG. 5A is a sectional view showing an in-use state of the video tape cassette illustrated in FIGS. 4A and 4B.
Figure 5B:
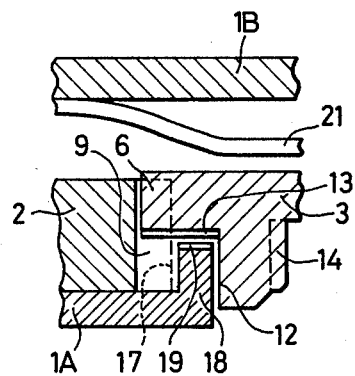
FIG. 5B is an enlarged view of a part of FIG. 5A.

FIG. 5A is a sectional view taken along line I—I (broken line) in FIG. 1 showing the video tape cassette according to the invention in use. FIG. 5B is an enlarged view of the left half of FIG. 5A.

In FIGS. 5A and 5B, reference numerals 1A and 2 through 20 designate components which are designated by the same reference numerals in FIGS. 1 through 4. Reference numeral 1B designates an upper cassette half and 21 a leaf spring for biasing the inner drum of the dual-structure hub in the axial direction of the shaft hole 20 or downwardly of the cassette.

Figure 6A:
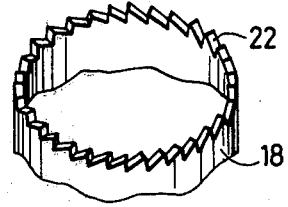
FIGS. 6A and 6B are perspective views showing examples of teeth which are formed on the upper surface of a cylindrical engaging wall in FIGS. 5A and 5B for preventing tape from being unwound.
Figure 6B:
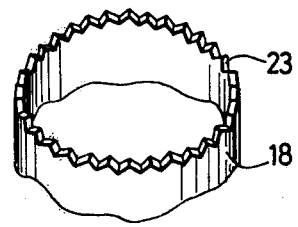

FIGS. 6A and 6B are perspective views at an enlarged scale showing the cylindrical support 18 shown in FIGS. 5A and 5B viewed from above. In FIG. 6, reference numerals 22 and 23 designate teeth formed on the upper surface 19 of the cylindrical support 18.

The aforementioned leaf spring is provided to urge the inner drum 3 downwardly of the cassette half with a force which is weaker than the force of the drive shaft R around which the shaft hole 20 in the inner drum 3 is disposed. This raises the inner drum 3 upwardly of the cassette half. The leaf spring may be replaced by a friction sheet as described below to bias the dual-structure hub in the axial direction.

In FIG. 5B, the teeth 22 or 23 as shown in FIGS. 6A and 6B are formed on the upper surface 19 of the cylindrical support 18 of the lower cassette half 1A while teeth corresponding to the teeth 22 or 23, or mating teeth, are formed on the rotation contact surface 13 of the inner drum 13 which is brought into contact with the cylindrical support 18.

The teeth 22 or 23 are provided to prevent the rotation of the dual-structure hub in the tape unwinding direction. As indicated typically by the upper surface 19 of the cylindrical support 18 in FIG. 6A, the teeth 22 or 23 are preferably formed as ratchet teeth. The mating teeth are formed on the rotation contact surface of the inner drum 3 so as to engage the teeth of the cylindrical support 18. The mating teeth are preferably so formed as to permit rotation in the tape winding direction but not in the tape unwinding direction.

The leaf spring 21 which energizes the hub is secured to the upper surface half 1B. The leaf spring 21 urges the inner drum 3 of the dual-structure hub downwardly to cause engagement of the two sets of teeth. When the cassette is loaded in the video device, the shaft hole 20 is disposed around the drive shaft R whereupon the inner drum 3 of the dual-structure hub is lifted higher than the predetermined height against the leaf spring 21 as a result of which the inner drum is disengaged so that it can turn in either the clockwise or counterclockwise direction.

The above-described teeth may have a rectangular shape such as the teeth 23 shown in FIG. 6B. The angular size of each of the teeth is of 5° to 20°, preferably 10°, with the circumference divided equally. If the size of the teeth is too small, the teeth cannot adequately prevent rotation. If the size is too large, the inner drum will have too much play and it is difficult to disengage the inner drum from the cylindrical support 18. Therefore, it is preferred that the size should be selected within the above-described range. It is desirable that the teeth of the inner drum be equal in size to the teeth of the cylindrical support. However the size of the former may be one-third to twice that of the latter teeth or vice versa.

If friction sheets having curls or the like are provided between the leaf spring 21 and the dual-structure hub and between the outer drum 2 of the dual-structure hub and the lower cassette half so that the dual-structure and the end face of the magnetic tape wound on the dual-structure hub can be moved elastically upwardly and downwardly, then the position of the outer drum 2 can be regulated, the running stability of the tape is improved, and irregular winding operations are prevented.

Figure 7A:
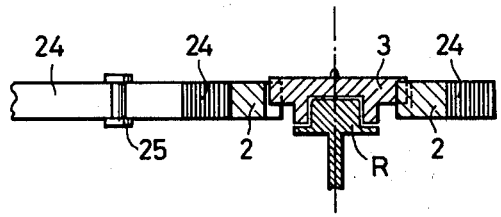
FIGS. 7A and 7B are explanatory diagrams showing tape running states in the video tape cassette of the invention.
Figure 7B:
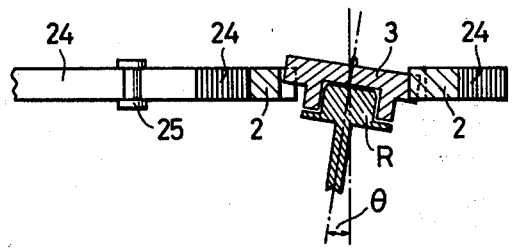
Figure 7C:
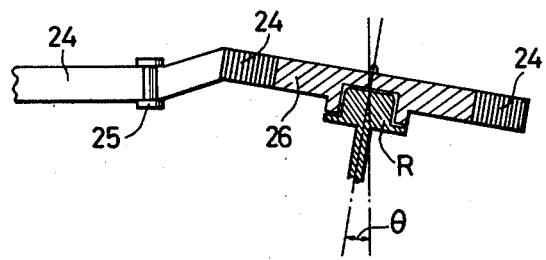
FIG. 7C is an explanatory diagram showing a tape running state in a conventional video tape cassette.

FIGS. 7A and 7B illustrate magnetic tape running states of the video tape cassette according to the invention. FIG. 7C illustrates a tape running state when a video tape cassette with a conventional flangeless hub not of the dual-structure is used. In FIG. 7, the video tape cassette is not shown and only the hub and the magnetic tape are shown so that the magnetic tape running states can be clearly understood. In FIGS. 7A–7C, reference character R designates the drive shaft of the video device, θ the angle of inclination of the drive shaft R, 24 the magnetic tape wound on the hub, 25 a tape guide on the side of the video device, and 26 a conventional flangeless hub.

A video tape cassette with a conventional flangeless hub as shown in FIG. 7C will be described. When the hub is not held sufficiently high vertically or it is inclined by an angle θ, the position of the tape winding surface is different from the position in which the tape is correctly run and wound. In this case, the magnetic tape 24, being abruptly bent by the guide 25, is wound on the hub 26. Therefore, the wound tape end face is parabolic instead of flat and may even be stepped. In this case, an excessive force is applied to the end face of the wound tape 24. As a result, a physical distortion which cannot be restored is imparted to the magnetic tape 24 as a result of which the quality of the reproduced video picture is lowered and the video system reliability is reduced.

Portable video tape recorders (VRT) or small video tape recorders are often used outdoors. Accordingly, vibration and shock are frequently applied to the video tape recorder bodies and accordingly the video tape cassette more frequently than with ordinary home video tape recorders so that the reliability of a portable video tape recorders or small video tape recorders is generally much lower when conventional flangeless hubs are employed.

FIG. 7A shows the ordinary tape running state of a video tape cassette constructed according to the present invention and FIG. 7B shows the tape running state in the case when the drive shaft R of the video device using the video tape cassette of the invention is inclined by an angle θ from its normal position.

In the video tape cassette of the invention, the hub is of the dual structure in which the inner drum 3 is loosely fitted into the outer drum 2. Therefore, even when the drive shaft R is inclined, the outer drum 3 is stably maintained parallel to the tape running plane. Thus, the tape running stability is improved with the invention and the reproduced video picture quality is maintained unchanged.

Torque to the outer drum 2 is transmitted from the arms 5, 6 and 7 in FIGS. 2 through 5 through the corresponding slots 8, 9 and 10 in FIGS. 2 through 5 to the drive shaft R, the inner drum 3 and the outer drum 2 in the stated order. In addition, the hub is of a dual structure as described before. Because of this construction the outer drum 2 can be maintained much more parallel to the magnetic tape running plane than in the conventional hub.

This effect can be improved by inserting the elastic friction sheets, which may be for instance Teflon TM sheets, super-macromolecular polyethylene sheets, or silicon sheets, or sheets obtained by mixing carbon black, graphite or the like therewith and which elastically contact the magnetic tape and the outer drum 2 between the leaf spring and the dual-structure hub and between the outer drum and the lower cassette half as described with reference to FIG. 5.

As the video tape cassette according to the invention has a dual-structure hub composed of the inner drum and the outer drum, the video tape cassette of the invention has a high tape running stability and accordingly is quite advantageous for use with a portable video system or with a miniaturized video system.

In the video tape cassette according to the invention, the tape winding hubs are the above-described dual-structure, that is, flangeless hubs of small thickness thus leading to easy miniaturization of the cassette. Furthermore, according to the invention, an engaging groove of relatively large depth is engaged with the relatively high engaging wall so that the dual-structure hub is held at the preferred predetermined position on the lower cassette half and therefore the dual-structure hub cannot easily be moved from the position. Accordingly, even if the dual-structure hubs are mounted on the lower cassette half in advance during cassette assembly, the cassette can still be readily handled thus contributing to the ease of cassette assembly. In addition, the positions of the dual-structure hubs do not shift during tape running and therefore the magnetic tape is protected from damage and the tape running characteristics are improved.

Moreover, the entire mechanism for stopping the rotation of the hubs when the cassette is not in use are provided in the hubs so that the space in the cassette can be effectively utilized.

What is claimed is:

1. A video tape cassette comprising: a casing including an upper cassette half and a lower cassette half; and a pair of magnetic tape feeding and taking-up flangeless type cylindrical tape winding hubs operatively disposed in said casing, each of said hubs having a dual structure including an inner drum adapted to engage a drive shaft of a video tape utilization device and an outer drum on which a magnetic tape is wound; said inner drum having first engaging means for transmitting torque from said drive shaft to said outer drum; said outer drum having second engaging means for receiving torque from said first engaging means, said inner drum being loosely fitted into said outer drum in the axial direction of said drive shaft to maintain said outer drum in a stable running plane.

2. The video tape cassette as claimed in claim 1 wherein said inner drum has at least two first engaging means and said outer drum has at least two second engaging means.

3. A video tape cassette comprising: a casing including an upper cassette half and a lower cassette half; and a pair of magnetic tape feeding and taking-up flangeless type cylindrical tape winding hubs operatively disposed in said casing, each of said hubs having a dual structure including an inner drum adapted to engage a drive shaft of a video tape utilization device and an outer drum on which a magnetic tape is wound; said inner drum having first engaging means for transmitting torque to said outer drum; said outer drum having second engaging means for receiving torque from said first engaging means, said inner drum being loosely fitted into said outer drum in the axial direction of said drive shaft; said lower cassette half comprising a cylindrical support extending upwardly from the inner surface of said lower cassette half for rotatably supporting said dual-structure hub;

said outer drum of said dual-structure hub having an outer circumferential wall and said inner drum has on the lower surface thereof an inner circumferential wall and a rotation contact surface disposed in contact with the upper surface of said cylindrical support;

said inner drum and said outer drum cooperating to form an engaging groove coaxially with said dual-structure hub extending from the lower surface of said dual-structure hub substantially to half of the height of said outer circumferential wall; and means for rotatably supporting said cylindrical support and said dual-structure hub.

4. The video cassette tape as claimed in claim 3 wherein:

the height of said cylindrical support is such that the bottom of said engaging groove formed by said inner drum and said outer drum of said dual-structure hub are in contact with the upper surface of said cylindrical support when said cassette is not in use;

said both surfaces thus brought into contact with each other are provided with teeth which are engaged with each other to prevent the rotation of said dual-structure hub at least in the tape unwinding direction thereof; and said casing comprising biasing means therein for urging said two surfaces into contact with each other whereby, when said cassette is not in use, said two surfaces are in contact with each other to prevent the rotation of said dual-structure hub in the tape unwinding direction.

5. The video tape cassette as claimed in claim 4 wherein said tape winding dual-structure hub is disposed to be moved against the force of said biasing means when said cassette is in use whereby said two surfaces are disengaged from each other to allow said dual-structure hub to freely rotate.

6. The video tape cassette as claimed in claim 4 wherein the teeth of said two surfaces which are brought into contact with each other have a sawtooth shape.

* * * * *